United States Patent
Culver

[11] 3,752,500
[45] Aug. 14, 1973

[54] OCCUPANT RESTRAINT SYSTEM

[75] Inventor: Clyde C. Culver, Rochester, Mich.

[73] Assignee: General Motors Corporation, Detroit, Mich.

[22] Filed: Mar. 1, 1971

[21] Appl. No.: 119,483

[52] U.S. Cl. ............. 280/150 AB, 251/282, 137/38
[51] Int. Cl. ............................................ B60r 21/10
[58] Field of Search ................ 280/150 AB; 137/38; 138/45, 46; 251/282

[56] References Cited
UNITED STATES PATENTS

| | | | |
|---|---|---|---|
| 3,638,964 | 2/1972 | Chute ............................ | 280/150 AB |
| 2,649,311 | 8/1953 | Hetrick ......................... | 280/150 AB |
| 3,430,979 | 3/1969 | Terry et al. ..................... | 280/150 AB |
| 2,776,673 | 1/1957 | Goodman et al. ................ | 138/46 X |
| 3,158,149 | 11/1964 | Gray .............................. | 137/38 X |
| 2,850,291 | 9/1958 | Ziccardi ........................ | 280/150 AB |
| 2,760,484 | 8/1956 | Ferwerda ....................... | 137/38 X |
| 3,578,006 | 5/1971 | Betz ............................... | 137/38 |
| 3,674,059 | 7/1972 | Stephenson .................... | 280/150 AB |

*Primary Examiner*—Kenneth H. Betts
*Attorney*—W. E. Finken et al.

[57] ABSTRACT

An occupant restraint system includes a vessel sealed by a rupturable diaphragm and providing a source of pressure fluid. The outlet of the vessel communicates with an inflatable cushion. A variable area orifice device controls the pressure fluid flow between the vessel and the cushion in accordance with the intensity of the acceleration pulse applied to the vehicle. The device includes an elongated cylinder having a first pair of diametrically opposite grooves in the wall thereof providing first passages communicating with the cushion, and a second pair of diametrically opposite grooves in the wall thereof providing second passages located circumferentially intermediate the first passages and communicating with the vessel. A sleeve fits within the cylinder and includes axially spaced first and second pairs of diametrically opposite openings from the interior thereof to the first passages and a third pair of diametrically opposite openings from the second passages to the interior thereof and located circumferentially intermediate the first pair of openings. A spool valve is movable within the sleeve and has one land engaging a fixed stop under a compression spring seating against the other land to locate the valve in unactuated position. In this position the first and third pairs of openings open to the space between the adjacent ends of the lands. The adjacent end of the other land partially closes the first pair of openings to provide a variable area orifice between the interior of the sleeve and the first passages communicating with the cushion. The second pair of openings open to the remote end of the other land, and the first passages open to the remote end of the one land. When an acceleration pulse of predetermined amplitude and time is received by the vehicle, the diaphragm is ruptured and the pressure fluid released for flow into the second passages and thence through the third pair of openings to the interior of the sleeve between the lands. The fluid then flows outwardly of the sleeve through the variable area orifice to first passages for flow to the cushion. The acceleration pulse is likewise applied to the valve spool and the other land moves axially of the sleeve to set the area of the orifice. The area of the orifice is dependent on the intensity of the pulse. The second pair of openings provides for flow of the pressure fluid from the first passages to the remote end of the other land so that the pressure on the adjacent and remote ends of both lands is equal.

4 Claims, 4 Drawing Figures

PATENTED AUG 14 1973 3,752,500
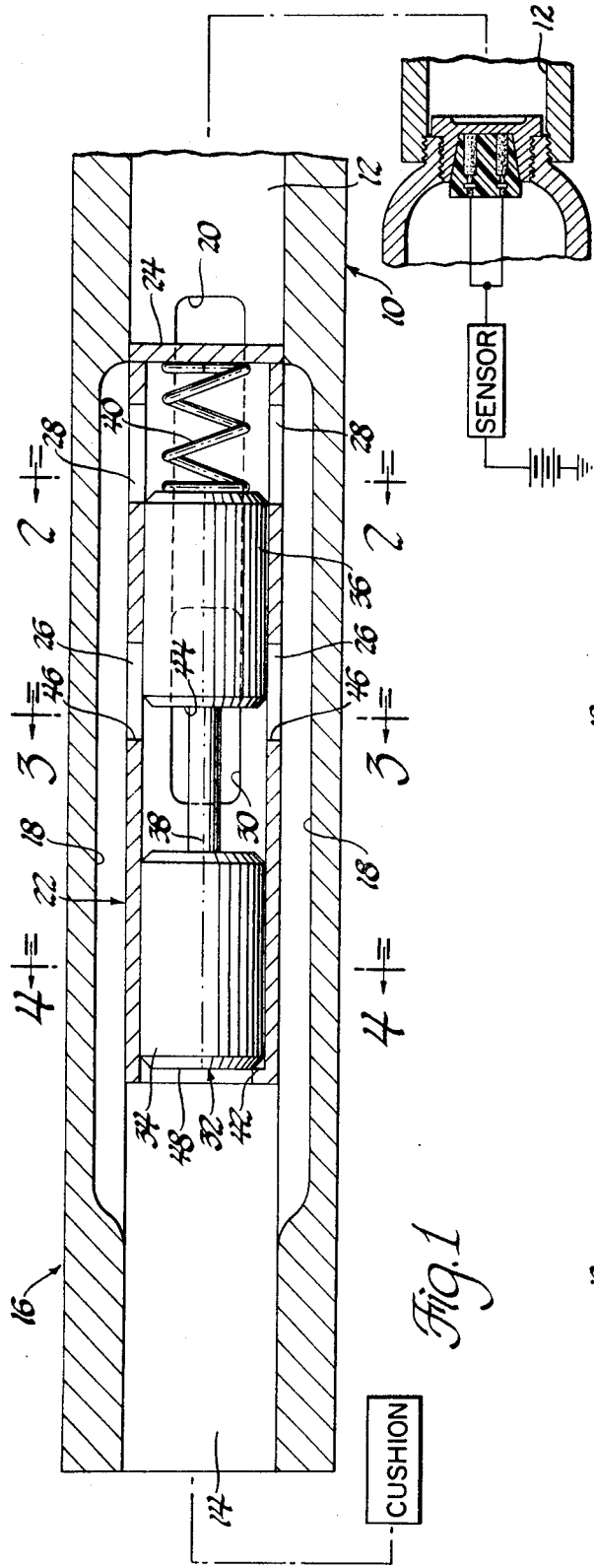
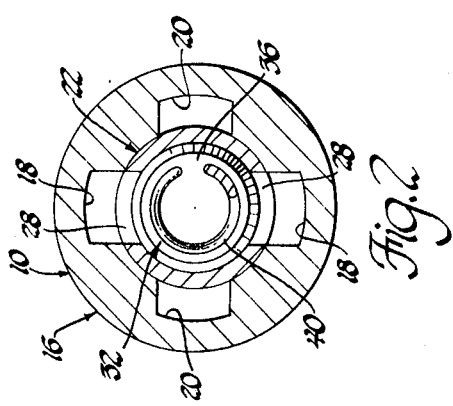
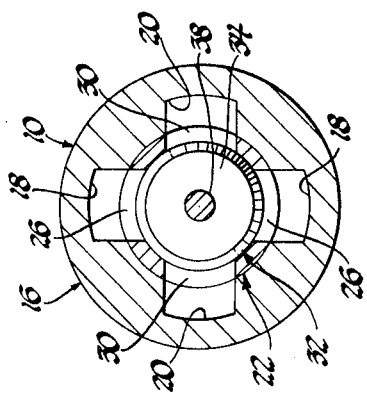
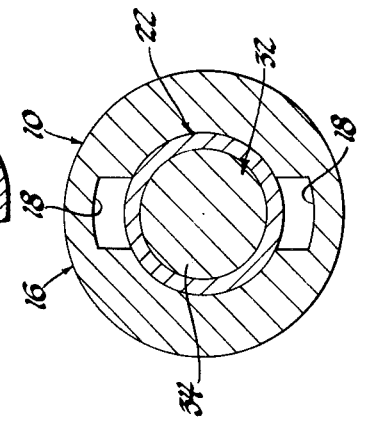
INVENTOR.
Clyde C. Culver
BY
Herbert Furman
ATTORNEY

OCCUPANT RESTRAINT SYSTEM

This invention relates to vehicle occupant restraint systems and more particularly to a vehicle occupant restraint system having a variable area orifice device controlling the flow of pressure fluid between the pressure fluid source and the inflatable cushion in accordance with the intensity of the acceleration pulse applied to the vehicle.

Conventional occupant restraint systems include a vessel providing a source of pressure fluid and having an outlet sealed by a rupturable diaphragm. The outlet of the vessel communicates with a manifold and diffuser assembly which permit flow of the pressure fluid to the inflatable cushion when the diaphragm is ruptured. In order to control the flow of the pressure fluid, various types of valves have been proposed.

One type of valve includes a valve land normally located in closed position to completely block flow from the pressure vessel to the cushion. The valve land is moved from closed to completely open position by a weight member movable to actuated position under inertial forces appplied to the vehicle. The weight member is detented in actuated position to hold the valve land in open position. The valve land provides no variable orifice bewteen the vessel and cushion and no control of the flow of pressure fluid to the cushion in accordance with the intensity of the pulse. Another type of valve is shown in copending application Ser. No. 85,490 Prachar, Occupant Restraint System, filed Oct. 30, 1970 (now abandoned), and assigned to the assignee of this invention. In this device, a variable orifice is provided by a piston movable within a variable volume fluid chamber under the pressure of the fluid. While a variable orifice results, the effective area of the orifice bears no relatioriship to the intensity of the acceleration pulse applied to the vehicle.

The variable area orifice of this invention provides a minimum area orifice controlling flow from the pressure vessel to the cushion. The increase in orifice area from the minimum area to a maximum area depends on the intensity of the acceleration pulse applied to the vehicle. In the preferred embodiment of the invention, this is accomplished by an inertia responsive spool valve controlling the flow of pressure fluid between pairs of diametrically opposite passages communicating with each other through an apertured valve sleeve. One pair of passages communicates the vessel with the interior of the valve sleeve and the other pair of passages communicates the cushion with the interior of the valve sleeve through one pair of openings in the valve sleeve controlled as to effective area by a valve land. The passages and openings are further arranged so that the pressure of the fluid is equally applied to the adjacent and remote ends of the valve lands whereby the position of the spool valve is responsive only to the pulse and not to the pressure of the fluid.

Therefore, a primary feature of this invention is that it provides a variable area orifice device controlling the flow of pressure fluid between a pressure fluid source and an inflatable cushion in accordance with the intensity of an acceleration pulse of predetermined amplitude and time.

This and other features of the invention will be readily apparent from the following specification and drawings wherein:

FIG. 1 is a sectional view of a variable area orifice device according to this invention, with the device being shown in unactuated position;

FIG. 2 is a sectional view taken generally along the plane indicated by line 2—2 of FIG. 1;

FIG. 3 is a sectional view taken generally along the plane indicated by line 3—3 of FIG. 1; and FIG. 4 is a sectional view taken generally along the plane indicated by line 4—4 of FIG. 1.

Referring now to the drawings, a variable area orifice device designated generally 10 according to this invention includes an inlet 12 and an outlet 14 which are provided at opposite ends of a cylinder 16. The inlet 12 communicates with the outlet of a conventional vessel sealed by rupturable diaphragm and providing a source of pressure fluid for inflation of the inflatable occupant restraint cushion. The diaphragm may be ruptured either mechanically, as shown, or by fluid pressure in accordance with an acceleration pulse of predetermined amplitude and time being sensed by a suitable sensor mounted on the vehicle. The outlet 14 communicates with a manifold or communicates directly with a diffuser which inflates the occupant restraint cushion. These details are not important to an understanding of the invention and, accordingly, are not shown.

The cylinder 16 includes a rather thick wall having a first pair of diametrically opposite grooves intermediate the ends thereof providing outlet or first passages 18. Likewise the cylinder 16 includes a second pair of diametrically opposite grooves which are intermediate or at 90° to the grooves providing passages 18 and which provide inlet or second passages 20. A sleeve 22 fits within the interior of the cylinder 16 and engages the wall portions of the cylinder intermediate the passages 18 and 20 as shown in FIGS. 2 through 4, inclusive. The sleeve may be secured in place by any suitable manner. One end of the sleeve 22 is closed by end wall 24 which extends across the inlet 12 adjacent one end of passages 18 to block communication between the inlet 12 and these passages. The end wall 24 also extends across the passages 20 adjacent one end thereof to provide for communication between the inlet 12 and the inlet passages 20.

The sleeve 22 further includes first and second pairs of diametrically opposite elongated slots or openings 26 and 28 which communicate the interior of the sleeve 22 with the outlet passages 18. The sleeve further includes a third pair of diametrically opposite elongated slots or openings 30 which communicate the interior of the sleeve with the inlet passages 20. The openings 30 are located intermediate the openings 26 at 90° with respect thereto. The left-hand ends of the openings 30 are coextensive with the left-hand ends of passages 20.

A spool valve 32 includes valve lands 34 and 36 interconnected by a rod 38. A coil compression spring 40 seats between the wall 24 and the remote end of land 36 to bias the spool valve to the left as viewed in FIG. 1 and hold the remote end of land 34 in engagement with a fixed stop 42 provided by an integral tab at the other open end of the sleeve 22.

In the unactuated position shown in FIG. 1, land 36 partially closes the openings 26. The adjacent end 44 of this land cooperates with the portions 46 of openings 26 to provide minimum area orifices controlling the flow of pressure fluid from the openings 30 to the outlet passages 18.

The spring 40 and the weight of the valve spool 32 are set so that movement of the spool valve 32 can occur only when the spool valve is subjected to an acceleration pulse of predetermined amplitude and time. The area of the orifices controlling the flow of the pressure fluid from the openings 30 to the passages 18 is controlled by the position of the adjacent end 44 of land 36 with respect to the portions 46 of openings 26.

When an acceleration pulse of predetermined amplitude and time is applied to the vehicle, the pulse is sensed by a sensor and the diaphragm controlling the flow of pressure fluid from the vessel is thereupon ruptured. The valve spool 32 shifts to the right against the action of the spring 40 in accordance with the intensity of the pulse. The extent of movement of the valve spool controls the position of the adjacent end 44 of land 36 with respect to the openings 26 to thereby control the area of the orifices defined thereby and control the flow of pressure fluis from the openings 30 to the outlet passages 18. Thus, the area of the orifices is dependent upon the intensity of the acceleration pulse.

The openings 28 communicate the remote end of land 36 with the pressure fluid so that the pressure on both ends of land 36 is the same. Likewise, it will be noted that the passages 18 open to the remote end 48 of land 34 and that openings 30 open to the adjacent end of this land so that the pressure on both ends of this land is likewise the same and the same as that on both ends of land 36. Thus, the movement of the spool valve 32 is dependent upon the intensity of the pulse and not dependent upon pressure applied to either land.

Thus, this invention provides an occupant restraint system having a variable area orifice device controlling the flow of pressure fluide between the pressure fluid source and the inflatable cushion in accordance with the intensity of the acceleration pulse applied to the vehicle.

I claim:

1. In an occupant restraint system, the combination comprising, a vessel providing a source of pressure fluid and having an outlet sealed by a rupturable seal, means responsive to an acceleration pulse of predetermined amplitude and time for rupturing the seal, a hollow annular member including first passage means communicating with the outlet, second passage means communicating with an inflatable occupant restraint cushion, sleeve means within the member opening to the first passage means and including fixed area orifice means communicating the sleeve means with the second passage means, and valve means movable within the sleeve means under the pulse and being located with respect to the fixed area orifice means to set the effective area thereof in accordance with the intensity of the pulse.

2. In an occupant restraint system for a vehicle subject to impact with an obstacle, the combination comprising, a source actuatable to provide pressure fluid, means responsive to the intensity of the impact for actuating the source, first passage means communicating with the source, second passage means communicating with an inflatable occupant restraint cushion, a valve sleeve interconnecting the first and second passage means and including at least one opening providing orifice means controlling communication between the first and second passage means, valve means including a valve spool slidably received within the valve sleeve and normally located in a predetermined position with respect to the valve sleeve opening to provide a minimum area orifice, the valve spool being movable relative to the sleeve opening in accordance with the intensity of the impact to increase the effective area of the sleeve opening as a function of such intensity, and means applying pressure fluid equally to the valve spool to ensure that the position of the valve spool is responsive to the intensity of the impact.

3. In an occupant restraint system for a vehicle subject to impact with an obstacle, the combination comprising, a source actuatable to provide pressure fluid, means responsive to the intensity of the impact for actuating the source, first passage means communicating with the source, second passage means communicating with an inflatable occupant restraint cushion, annular passage means including inlet means opening to the first passage means and outlet means opening to the second passage means and providing a fixed area orifice controlling communication between the first and second passage means, an inertial responsive valve member of predetermined weight and including a valve face movable within the annular passage means to a multiplicity of positions relative to the fixed area orifice in accordance with the intensity of the impact for opening portions of the area of such orifice and setting the effective area thereof in accordance with the intensity of the impact, and means communicating the annular passage means with the second passage means to communicate pressure fluid with an opposite valve face of the valve member to thereby apply pressure fluid equally to the valve member and ensure that the position thereof is responsive to the intensity of the impact.

4. In an occupant restraint system for a vehicle subject to impact with an obstacle, the combination comprising, a source actuatable to provide pressure fluid, means responsive to the intensity of the impact for actuating the source, valve means including an annular valve bore, first passage means communicating with the source and extending axially of the valve bore, second passage means communicating with an inflatable occupant restraint cushion and extending axially of the valve bore in circumferentially spaced relationship to the first passage means, inlet means communicating the bore and the first passage menas, outlet means communicating the bore and the second passage means and providing a fixed area orifice controlling communication between the first and second passage means through the bore, an inertial responsive valve member of predetermined weight and including a valve face movable within the valve bore to a multiplicity of positions relative to the fixed area orifice in accordance with the intensity of the impact for opening portions of the area of such orifice and setting the effective area thereof in accordance with the intensity of the impact, and means communicating the bore with the second passage means to communicate pressure fluid with an opposite valve face of the valve member to thereby apply pressure fluid equally to the valve member and ensure that the position thereof is responsive to the intensity of the impact.

* * * * *